(12) United States Patent
Islam et al.

(10) Patent No.: US 12,323,211 B2
(45) Date of Patent: Jun. 3, 2025

(54) SUPPORT OF SIMPLIFIED MULTIPLE INPUT MULTIPLE OUTPUT FEATURES FOR REDUCED CAPABILITY USER EQUIPMENT IN NEW RADIO SYSTEMS

(71) Applicant: Intel Corporation, Santa Clara, CA (US)

(72) Inventors: Toufiqul Islam, Santa Clara, CA (US); Alexei Davydov, Nizhny Novgorod (RU); Victor Sergeev, Dublin (IE); Debdeep Chatterjee, San Jose, CA (US); Seunghee Han, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 398 days.

(21) Appl. No.: 17/919,498

(22) PCT Filed: May 14, 2021

(86) PCT No.: PCT/US2021/032594
§ 371 (c)(1),
(2) Date: Oct. 17, 2022

(87) PCT Pub. No.: WO2021/231957
PCT Pub. Date: Nov. 18, 2021

(65) Prior Publication Data
US 2023/0246689 A1    Aug. 3, 2023

Related U.S. Application Data

(60) Provisional application No. 63/025,834, filed on May 15, 2020.

(51) Int. Cl.
*H04B 7/06* (2006.01)
*H04B 7/0413* (2017.01)
*H04L 5/00* (2006.01)
*H04W 72/23* (2023.01)

(52) U.S. Cl.
CPC ........ *H04B 7/0628* (2013.01); *H04B 7/0413* (2013.01); *H04L 5/0053* (2013.01); *H04L 5/0094* (2013.01); *H04W 72/23* (2023.01)

(58) Field of Classification Search
CPC ... H04B 7/0628; H04B 7/0413; H04L 5/0053; H04L 5/0094; H04L 5/0044; H04L 5/0023; H04W 72/23; H04W 8/20; H04W 4/70
See application file for complete search history.

(56) References Cited

U.S. PATENT DOCUMENTS

| 10,116,364 B2 | 10/2018 | Zhang et al. |
| 2015/0201326 A1 | 7/2015 | Kazmi et al. |

(Continued)

FOREIGN PATENT DOCUMENTS

| CN | 11105283 A | 4/2020 |
| WO | 2018/084971 A1 | 5/2018 |
| WO | 2020/092199 A1 | 5/2020 |

OTHER PUBLICATIONS

3GPP, "Study on Communication for Automation in Vertical Domains (Release 16)," 3GPP TR 22.804 V16.2.0 (Dec. 2018), 5G, 135 pages.

(Continued)

*Primary Examiner* — Hashim S Bhatti
(74) *Attorney, Agent, or Firm* — Schwabe, Williamson & Wyatt, P.C.

(57) ABSTRACT

Among other things, embodiments of the present disclosure are directed to the support of a new class of Reduced Capability (RedCap) New Radio (NR) user equipments (UEs), focusing on the simplification of various multiple input multiple output (MIMO) related features and operations. Other embodiments may be disclosed and/or claimed.

15 Claims, 6 Drawing Sheets

--- retrieving, from memory, capability information for a reduced capability (RedCap) user equipment (UE) that includes an indication of a number of antennas supported by the RedCap UE for downlink (DL) reception, and an indication of a number of antennas supported by the RedCap UE for uplink (UL) transmission
405

↓ encoding a message for transmission to a next-generation NodeB (gNB) that includes the capability information
410

(56) References Cited

U.S. PATENT DOCUMENTS

| | | | |
|---|---|---|---|
| 2018/0206113 A1 | 7/2018 | He et al. | |
| 2020/0396684 A1* | 12/2020 | Lin | H04W 52/0238 |
| 2021/0105108 A1* | 4/2021 | Abdelghaffar | H04L 5/001 |
| 2021/0242913 A1* | 8/2021 | Manolakos | H04B 7/0473 |
| 2023/0071926 A1* | 3/2023 | Liu | H04W 24/02 |
| 2023/0362787 A1* | 11/2023 | Ohlsson | H04W 48/18 |

OTHER PUBLICATIONS

Ericsson, "New SID on support of reduced capability NR devices," 3GPP TSG RAN Meeting #86, RP-193238, Agenda Item: 9.1.1, Dec. 9-12, 2019, Sitges, Spain, 5 pages.
3GPP, "NR; Physical layer procedures for data (Release 15)," 3GPP TS 38.214 V15.8.0 (Dec. 2019), 5G, 106 pages.
3GPP, "NR; Physical layer procedures for control (Release 15)," 3GPP TS 38.213 V15.8.0 (Dec. 2019), 5G, 109 page.
International Patent Office- International Search Report and Written Opinion mailed Aug. 30, 2021, from International Application No. PCT/US2021/032594, 11 pages.
China Unicom, "Potential UE complexity reduction features," 3GPP TSG RAN WG1 #100 bis, R1-2003307, Agenda Item: 8.3.1, May 25-Jun. 5, 2020, e-Meeting, 4 pages.
European Patent Office—Extended European Search Report mailed Mar. 27, 2024 from EP Patent Application No. 21804898.1 (10 pages).

* cited by examiner

```
┌─────────────────────────────────────────────┐
│                                             │
│   retrieving, from memory, capability       │
│   information for a reduced capability      │
│   (RedCap) user equipment (UE) that         │
│   includes an indication of a number of     │
│   antennas supported by the RedCap UE for   │
│   downlink (DL) reception, and an           │
│   indication of a number of antennas        │
│   supported by the RedCap UE for uplink     │
│   (UL) transmission                         │
│                    405                      │
└─────────────────────────────────────────────┘
                      │
                      ▼
┌─────────────────────────────────────────────┐
│  encoding a message for transmission to a   │
│  next-generation NodeB (gNB) that includes  │
│           the capability information        │
│                    410                      │
└─────────────────────────────────────────────┘
```

Figure 4 receiving, from a reduced capability (RedCap) user equipment (UE), capability information for the RedCap UE that includes an indication of a number of antennas supported by the RedCap UE for downlink (DL) reception, and an indication of a number of antennas supported by the RedCap UE for uplink (UL) transmission
505

determining configuration information that includes an indication of a maximum number of multiple input multiple output (MIMO) layers for DL reception for the RedCap UE, and a maximum number of MIMO layers for UL transmission for the RedCap UE
510

encoding a message for transmission to the UE that includes the configuration information
515

Figure 5 determining capability information for the RedCap UE that includes an indication of a number of antennas supported by the 5G RedCap UE for downlink (DL) reception, and an indication of a number of antennas supported by the 5G RedCap UE for uplink (UL) transmission
605 encoding a message for transmission to a next-generation NodeB (gNB) that includes the capability information
610

Figure 6

SUPPORT OF SIMPLIFIED MULTIPLE INPUT MULTIPLE OUTPUT FEATURES FOR REDUCED CAPABILITY USER EQUIPMENT IN NEW RADIO SYSTEMS

CROSS REFERENCE TO RELATED APPLICATION

The present application is a national phase entry under 35 U.S.C. § 371 of International Application No. PCT/US2021/032594, filed May 14, 2021, entitled "SUPPORT OF SIMPLIFIED MULTIPLE INPUT MULTIPLE OUTPUT FEATURES FOR REDUCED CAPABILITY USER EQUIPMENT IN NEW RADIO SYSTEMS," which claims priority to U.S. Provisional Patent Application No. 63/025,834, which was filed May 15, 2020, the entire disclosures of which are hereby incorporated by reference.

FIELD

Embodiments herein generally relate to the field of wireless communications.

BACKGROUND

The 5G NR specifications cater to support of a diverse set of verticals and use cases, including enhanced mobile broadband (eMBB) as well as the newly introduced ultra-reliable and low latency (URLLC) services. Support for Low Power Wide Area (LPWA) networks and use cases for extremely low complexity/cost devices, targeting extreme coverage and ultra-long battery lifetimes, are expected to be served by machine-type communication (MTC) (Category M user equipments (UEs)) and narrow-band Internet of things (NB-IoT) (Category NB UEs) technologies.

Recently, it has been identified that it would be beneficial to support a class of NR UEs with complexity and power consumption levels lower than Rel-15 NR UEs, catering to use cases like industrial wireless sensor networks (IWSN), certain class of wearables, and video surveillance, to fill the gap between current LPWA solutions and eMBB solutions in NR and also to further facilitate a smooth migration from 3.5G and 4G technologies to 5G (NR) technology for currently deployed bands serving relevant use cases requiring relatively low-to-moderate reference (e.g., median) and peak user throughputs, low device complexity, small device form factors, and relatively long battery lifetimes.

Towards the above, a class of Reduced Capability (RedCap) NR UEs may be defined that can be served using the currently specified 5G NR framework with necessary adaptations and enhancements to limit device complexity and power consumption while minimizing any adverse impact to network resource utilization, system spectral efficiency, and operation efficiency.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 4 depicts an example procedure for practicing the various embodiments discussed herein.

FIG. 5 depicts another example procedure for practicing the various embodiments.

FIG. 6 depicts another example procedure for practicing the various embodiments.

DETAILED DESCRIPTION

Figure 1:
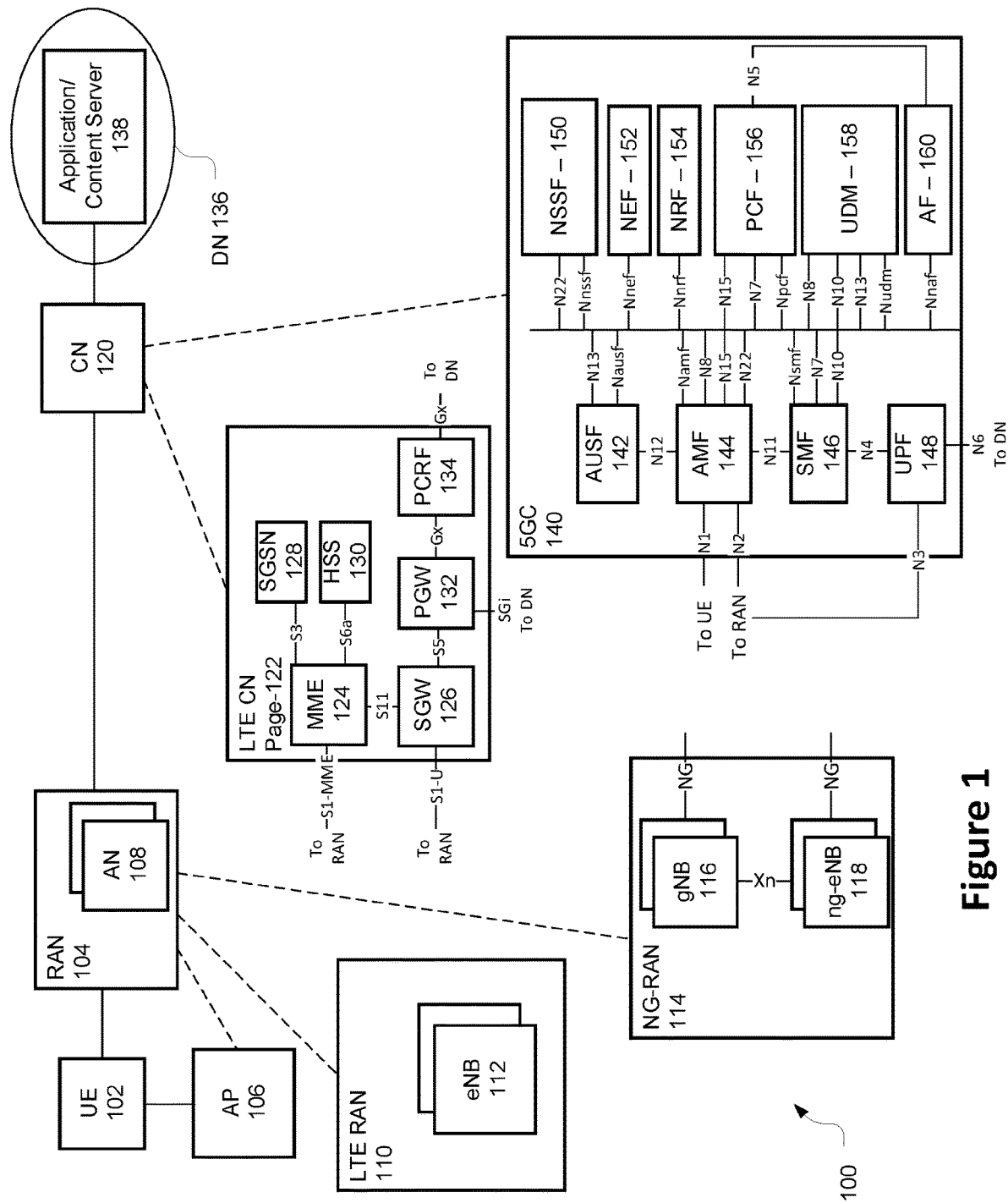
FIG. 1 illustrates a network in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

One of the primary components to UE complexity reduction is the simplifications to multiple input multiple output (MIMO) operations. In Rel-15 NR for single component carrier (CC) standalone NR, it is mandatory with capability signalling to support at least 4 MIMO layers in the bands where 4Rx (also referred to as "four Rx branches" or "four antennas") is specified as mandatory for the given UE and at least 2 MIMO layers in Frequency Range 2 (FR2). Thus, some relaxation in this regard maybe considered as potential direction towards limiting UE complexity.

Among other things, embodiments of the present disclosure are directed to the support of a new class of Reduced Capability NR UEs, focusing on the simplification of various MIMO related features and operations.

There are various use cases for NR devices that do not necessitate the support of enhanced MIMO operation. In this regard, the following use cases have been prioritized by 3GPP RAN for upcoming Rel-17 studies on potential introduction of reduced capability (RedCap) NR UEs (see RP-193238 (2019 Dec. 12), New SID on support of reduced capability NR devices):

Industrial wireless sensors: Reference use cases and requirements are described in TR 22.832 v17.1.0 (2019 Dec. 20) and TS 22.104 v17.2.0 (2019 Dec. 20): Communication service availability is 99.99% and end-to-end latency less than 100 ms. The reference bit rate is less than 2 Mbps (potentially asymmetric e.g. UL heavy traffic) for all use cases and the device is stationary. The battery should last at least few years. For safety related sensors, latency requirement is lower, 5-10 ms (TR 22.804 v16.2.0 (2018 Dec. 21))

Video Surveillance: As described in TS 22.804 v16.2.0 (2018 Dec. 21), reference economic video bitrate would be 2-4 Mbps, latency <500 ms, reliability 99%-

99.9%. High-end video e.g. for farming would require 7.5-25 Mbps. It is noted that traffic pattern is dominated by UL transmissions.

Wearables: Reference bitrate for smart wearable application can be 10-50 Mbps in DL and minimum 5 Mbps in UL and peak bit rate of the device higher, 150 Mbps for downlink and 50 Mbps for uplink. Battery of the device should last multiple days (up to 1-2 weeks).

To this end, several MIMO features have been identified that may facilitate UE complexity reduction and/or UE power saving. A RedCap UE may indicate via capability signaling whether the UE supports one or more of the following features or behaviors described in the embodiments and examples. "A UE is configured" implies the configuration is provided to UE via higher layer signaling such as RRC or MAC CE signaling, unless mentioned otherwise. It is assumed that a UE can be configured with one or more of following features based on or up to the value supported/reported as UE capability.

In one embodiment, for Frequency Range 1 (FR1), a RedCap NR UE may support 1 antenna in 700 MHz band and 2 antennas for other bands. Alternatively, UE may support 1 or 2 antennas in all bands in FR1. Here, and in the rest of the disclosure, for downlink (DL), "antennas" may also be referred to as "receiver (Rx) branches", and in the uplink (UL), "antennas" may also be referred to as "transmitter (Tx) branches." Consequently, in one example, support of maximum MIMO layers in downlink (DL) and uplink (UL) is no more than the number of antennas supported in DL and UL, respectively, in a given band. In one example, RedCap UE only supports one layer in DL or in UL in an NR band. In one example, RedCap UE may be configured with one or two maximum MIMO layers in DL or in UL via higher layer radio resource control (RRC) signaling, where the maximum MIMO layers can be indicated per DL or UL BWP, respectively, or per serving cell.

In one embodiment, UE maintains one active transmission configuration indicator (TCI) state for PDCCH which may be configurable by RRC signaling. In another option, UE may expect demodulation reference signal (DMRS) of physical downlink shared channel (PDSCH) has same TCI state as the DMRS of physical downlink control channel (PDCCH).

In one example, UE may not support additional active TCI state for PDCCH that is different than the number of active TCI states supported for PDSCH. In another example, RedCap UE may not support beam sweeping for PDSCH reception.

In another embodiment, UE may support 2 additional DMRS symbols only for single port, in addition to the 1 symbol front loaded DMRS for PDSCH. Similarly, in one example, UE may support 2 additional DMRS symbols only for single port, in addition to the 1 symbol front loaded DMRS for PUSCH.

In yet another embodiment, RedCap UE may not support beam correspondence and may not be required to perform UL beam sweeping.

In one embodiment, RedCap UE may support max # of ports across all configured non-zero power (NZP)-channel state information (CSI)-reference signal (RS) resources per CC to be no more than X, where X can be one of {2, 4, 8, 12, 16, 24}. In one example, the candidate values are for reporting are {2}, {2, 4}, {2, 4, 8}, {2, 4, 8, 12}, {2, 4, 8, 12, 16}, {2, 4, 8, 12, 16, 24} for X=2, 4, 8, 12, 16, and 24, respectively.

In another embodiment, RedCap UE may support max total # of CSI-RS ports in simultaneous NZP-CSI-RS resources in active bandwidth parts (BWPs) across all CCs or max total # of CSI-RS ports in simultaneous NZP-CSI-RS resources per CC to be no more than 24. In one example, the candidate values for reporting is {8, 16, 24} or {4, 8, 16, 24} or {4, 8, 16}. In one example, Type I single panel codebook construction for a RedCap UE is constrained based on the support of combination of max # of ports across all configured NZP-CSI-RS resources per CC, max total # of CSI-RS ports in simultaneous NZP-CSI-RS resources in active BWPs across all CCs, and max total # of CSI-RS ports in simultaneous NZP-CSI-RS resources per CC discussed above. UE can be configured with # of CSI RS ports up to the value supported in the capability.

In one embodiment, RedCap UE may only support processing of Y CSI report(s) simultaneously in a CC, where Y can be less than 5. In one example, Y is one of 2 or 3, 4. In another embodiment, RedCap UE can process X CSI report(s) simultaneously across all CCs where X can be less than 5. In one example, X is 2 or 3 or 4. CSI reports can be P/SP/A CSI and any latency class and codebook type. In Rel 15, minimum 5 for X or Y is mandatory which may be relaxed for RedCap UEs. UE can be configured with #CSI reports that can be simultaneously processed up to the value supported in the capability.

In one embodiment, RedCap UE may support tracking reference signal (TRS) bandwidth (BW) to be always equal to the size of active DL BWP, where the size of BWP can be less than 52 RBs, such as for 15 kHz subcarrier spacing (SCS). In one example, RedCap UEs may support TRS burst length to be more than two slots, such as 3, 4, 5, 6, 7, 8 etc. UE may be configured with TRS burst length with a value, such as above, up to the value reported by UE capability.

In one embodiment, RedCap UE may support single port sounding reference signal (SRS) only and may not support SRS Tx port switching.

In another embodiment, RedCap UE may only support wideband CSI reporting or wideband SRS and not support sub-band CSI report. In one example, UE may not support aperiodic CSI feedback or aperiodic SRS transmission and may not expect the presence of corresponding bit field in scheduling downlink control information (DCI) formats to provide the trigger. UE can be configured with such feature if capability is reported.

In one embodiment, RedCap UE is not expected to feedback PMI as part of CSI report. Alternatively, UE is only expected to report PMI consisting of a single wideband indication.

In one embodiment, CSI computation delay requirement can be relaxed for RedCap UEs when DCI triggers a CSI report. According to Rel-15 specifications (see TS 38.214 (, "NR: Physical layer procedures for data", V15.9.0 (2020 Apr. 3)), when the CSI request field on a DCI triggers a CSI report(s) on PUSCH, the UE shall provide a valid CSI report for the n-th triggered report, if the first uplink symbol to carry the corresponding CSI report(s) including the effect of the timing advance, starts no earlier than at symbol Zref, and if the first uplink symbol to carry the n-th CSI report including the effect of the timing advance, starts no earlier than at symbol Z'ref(n), where Zref is defined as the next uplink symbol with its CP starting $T_{proc,CSI} = (Z)(2048+144) \cdot \kappa 2^{-\mu} \cdot T_c$ after the end of the last symbol of the PDCCH triggering the CSI report(s), and where Z'ref(n), is defined as the next uplink symbol with its cyclic prefix (CP) starting $T'_{proc,CSI}(Z')(2048+144) \cdot \kappa 2^{-\mu} \cdot T_c$ after the end of the last symbol in time of the latest of: aperiodic CSI-RS resource for channel measurements, aperiodic CSI-IM used for interference measurements, and aperiodic NZP CSI-RS for interference measurement, when aperiodic CSI-RS is used for channel measurement for the n-th triggered CSI report. If the PUSCH indicated by the DCI is overlapping with another PUCCH or PUSCH, then the CSI report(s) are multiplexed following the procedure in clause 9.2.5 of TS 38.213, "NR: Physical layer procedures for control", V15.9.0 (2020 Apr. 3), and clause 5.2.5 when applicable, otherwise the CSI report(s) are transmitted on the PUSCH indicated by the DCI. TS 38.214 provides a definition of $\kappa$ and $T_c$.

Z, Z' and $\mu$ are defined as:

$$Z = \max_{m=0,\ldots,M-1}(Z(m)) \text{ and } Z' = \max_{m=0,\ldots,M-1}(Z'(m)),$$

where M is the number of updated CSI report(s) according to Clause 5.2.1.6 of TS 38.214, (Z(m), Z'(m)) corresponds to the m-th updated CSI report and is defined as

- $(Z_1, Z'_1)$ of the table 1 if the CSI is triggered without a PUSCH with either transport block or HARQ-ACK or both when L=0 CPUs are occupied (according to Clause 5.2.1.6) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or
- $(Z_1, Z'_1)$ of the table 2 if the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or
- $(Z_1, Z'_1)$ of the table 2 if the CSI to be transmitted corresponds to wideband frequency-granularity where the reportQuantity is set to 'ssb-Index-SINR', or reportQuantity is set to 'cri-SINR', or
- $(Z_3, Z'_3)$ of the table 2 if reportQuantity is set to 'cri-RSRP' or 'ssb-Index-RSRP', where X$\mu$ is according to UE reported capability beamReportTiming and $KB_l$ is according to UE reported capability beamSwitchTiming as defined in [13, TS 38.306], or
- $(Z_2, Z'_2)$ of table 2 otherwise.

$\mu$ of table 1 and table 2 corresponds to the min ($\mu_{PDCCH}$, $\mu_{CSI-RS}$, $\mu_{UL}$) where the $\mu_{PDCCH}$ corresponds to the subcarrier spacing of the PDCCH with which the DCI was transmitted and $\mu_{UL}$ corresponds to the subcarrier For RedCap UE, the values of $Z_1$ and $Z'_1$, $Z_2$ and $Z'_2$, $Z_3$ and $Z'_3$ can be larger than the captured values in Tables 1 and 2. In one example, value of $Z_1$, $Z'_1$, $Z_2$, $Z'_2$, $Z_3$ and/or $Z'_3$ can be increased by at least X symbols than the captured corresponding value in Tables 1 and/or 2 for a given SCS (i.e., $\mu$), where X can be one of {5, 6, 7, . . . , 10, 11, . . . , 15, 16, . . . 20, 21, . . . 30, 31, . . . 49, 50}. In other words, value of X can be different for $Z_i$ and $Z'_i$, i={1,2,3}, for a given SCS. Moreover, value of X can be same or different for $Z_i$ or $Z'_i$, for different SCS (i.e., $\mu$). In one example, Table 1 can be revised as follows for RedCap UEs, shown in Table 3.

SYSTEMS AND IMPLEMENTATIONS

Figure 2:
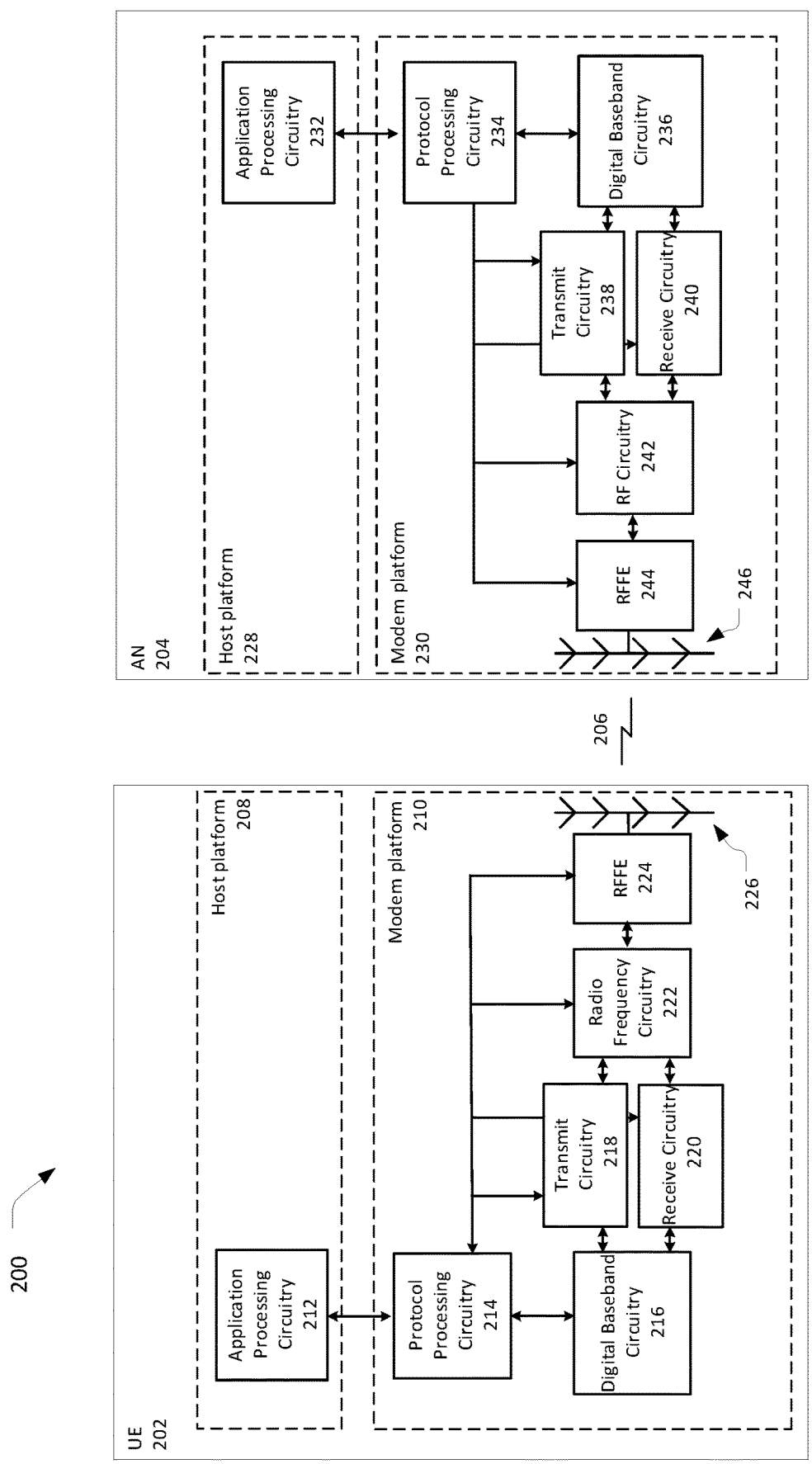
FIG. 2 schematically illustrates a wireless network in accordance with various embodiments.

FIGS. 1-2 illustrate various systems, devices, and components that may implement aspects of disclosed embodiments.

FIG. 1 illustrates a network 100 in accordance with various embodiments. The network 100 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 100 may include a UE 102, which may include any mobile or non-mobile computing device designed to communicate with a RAN 104 via an over-the-air connection. The UE 102 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 100 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 102 may additionally communicate with an AP 106 via an over-the-air connection. The AP 106 may manage a WLAN connection, which may serve to offload some/all network traffic from the RAN 104. The connection between the UE 102 and the AP 106 may be consistent with any IEEE 802.11 protocol, wherein the AP 106 could be a wireless fidelity (Wi-Fi®) router. In some embodiments, the UE 102, RAN 104, and AP 106 may utilize cellular-WLAN aggregation (for example, LWA/LWIP). Cellular-WLAN aggregation may involve the UE 102 being configured by the RAN 104 to utilize both cellular radio resources and WLAN resources.

The RAN 104 may include one or more access nodes, for example, AN 108. AN 108 may terminate air-interface protocols for the UE 102 by providing access stratum protocols including RRC, PDCP, RLC, MAC, and L1 protocols. In this manner, the AN 108 may enable data/voice connectivity between CN 120 and the UE 102. In some embodiments, the AN 108 may be implemented in a discrete device or as one or more software entities running on server computers as part of, for example, a virtual network, which may be referred to as a CRAN or virtual baseband unit pool. The AN 108 be referred to as a BS, gNB, RAN node, eNB, ng-eNB, NodeB, RSU, TRxP, TRP, etc. The AN 108 may be a macrocell base station or a low power base station for providing femtocells, picocells or other like cells having smaller coverage areas, smaller user capacity, or higher bandwidth compared to macrocells.

In embodiments in which the RAN 104 includes a plurality of ANs, they may be coupled with one another via an X2 interface (if the RAN 104 is an LTE RAN) or an Xn interface (if the RAN 104 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 104 may each manage one or more cells, cell groups, component carriers, etc. to provide the UE 102 with an air interface for network access. The UE 102 may be simultaneously connected with a plurality of cells provided by the same or different ANs of the RAN 104. For example, the UE 102 and RAN 104 may use carrier aggregation to allow the UE 102 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 104 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 102 or AN 108 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/ software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 104 may be an LTE RAN 110 with eNBs, for example, eNB 112. The LTE RAN 110 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 104 may be an NG-RAN 114 with gNBs, for example, gNB 116, or ng-eNBs, for example, ng-eNB 118. The gNB 116 may connect with 5G-enabled UEs using a 5G NR interface. The gNB 116 may connect with a 5G core through an NG interface, which may include an N2 interface or an N3 interface. The ng-eNB 118 may also connect with the 5G core through an NG interface, but may connect with a UE via an LTE air interface. The gNB 116 and the ng-eNB 118 may connect with each other over an Xn interface.

In some embodiments, the NG interface may be split into two parts, an NG user plane (NG-U) interface, which carries traffic data between the nodes of the NG-RAN 114 and a UPF 148 (e.g., N3 interface), and an NG control plane (NG-C) interface, which is a signaling interface between the nodes of the NG-RAN 114 and an AMF 144 (e.g., N2 interface).

The NG-RAN 114 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 102 can be configured with multiple BWPs where each BWP configuration has a different SCS. When a BWP change is indicated to the UE 102, the SCS of the transmission is changed as well. Another use case example of BWP is related to power saving. In particular, multiple BWPs can be configured for the UE 102 with different amount of frequency resources (for example, PRBs) to support data transmission under different traffic loading scenarios. A BWP containing a smaller number of PRBs can be used for data transmission with small traffic load while allowing power saving at the UE 102 and in some cases at the gNB 116. A BWP containing a larger number of PRBs can be used for scenarios with higher traffic load.

The RAN 104 is communicatively coupled to CN 120 that includes network elements to provide various functions to support data and telecommunications services to customers/ subscribers (for example, users of UE 102). The components of the CN 120 may be implemented in one physical node or separate physical nodes. In some embodiments, NFV may be utilized to virtualize any or all of the functions provided by the network elements of the CN 120 onto physical compute/storage resources in servers, switches, etc. A logical instantiation of the CN 120 may be referred to as a network slice, and a logical instantiation of a portion of the CN 120 may be referred to as a network sub-slice.

In some embodiments, the CN 120 may be an LTE CN 122, which may also be referred to as an EPC. The LTE CN 122 may include MME 124, SGW 126, SGSN 128, HSS 130, PGW 132, and PCRF 134 coupled with one another over interfaces (or "reference points") as shown. Functions of the elements of the LTE CN 122 may be briefly introduced as follows.

The MME 124 may implement mobility management functions to track a current location of the UE 102 to facilitate paging, bearer activation/deactivation, handovers, gateway selection, authentication, etc.

The SGW 126 may terminate an S1 interface toward the RAN and route data packets between the RAN and the LTE CN 122. The SGW 126 may be a local mobility anchor point for inter-RAN node handovers and also may provide an anchor for inter-3GPP mobility. Other responsibilities may include lawful intercept, charging, and some policy enforcement.

The SGSN 128 may track a location of the UE 102 and perform security functions and access control. In addition, the SGSN 128 may perform inter-EPC node signaling for mobility between different RAT networks; PDN and S-GW selection as specified by MME 124; MME selection for handovers; etc. The S3 reference point between the MME 124 and the SGSN 128 may enable user and bearer information exchange for inter-3GPP access network mobility in idle/active states.

The HSS 130 may include a database for network users, including subscription-related information to support the network entities' handling of communication sessions. The HSS 130 can provide support for routing/roaming, authentication, authorization, naming/addressing resolution, location dependencies, etc. An S6a reference point between the HSS 130 and the MME 124 may enable transfer of subscription and authentication data for authenticating/authorizing user access to the LTE CN 120.

The PGW 132 may terminate an SGi interface toward a data network (DN) 136 that may include an application/content server 138. The PGW 132 may route data packets between the LTE CN 122 and the data network 136. The PGW 132 may be coupled with the SGW 126 by an S5 reference point to facilitate user plane tunneling and tunnel management.

The PGW 132 may further include a node for policy enforcement and charging data collection (for example, PCEF). Additionally, the SGi reference point between the PGW 132 and the data network 1 36 may be an operator external public, a private PDN, or an intra-operator packet data network, for example, for provision of IMS services. The PGW 132 may be coupled with a PCRF 134 via a Gx reference point.

The PCRF 134 is the policy and charging control element of the LTE CN 122. The PCRF 134 may be communicatively coupled to the app/content server 138 to determine appropriate QoS and charging parameters for service flows. The PCRF 132 may provision associated rules into a PCEF (via Gx reference point) with appropriate TFT and QCI.

In some embodiments, the CN 120 may be a 5GC 140. The 5GC 140 may include an AUSF 142, AMF 144, SMF 146, UPF 148, NSSF 150, NEF 152, NRF 154, PCF 156, UDM 158, and AF 160 coupled with one another over interfaces (or "reference points") as shown. Functions of the elements of the 5GC 140 may be briefly introduced as follows.

The AUSF 142 may store data for authentication of UE 102 and handle authentication-related functionality. The AUSF 142 may facilitate a common authentication framework for various access types. In addition to communicating with other elements of the 5GC 140 over reference points as shown, the AUSF 142 may exhibit an Nausf service-based interface.

The AMF 144 may allow other functions of the 5GC 140 to communicate with the UE 102 and the RAN 104 and to subscribe to notifications about mobility events with respect to the UE 102. The AMF 144 may be responsible for registration management (for example, for registering UE 102), connection management, reachability management, mobility management, lawful interception of AMF-related events, and access authentication and authorization. The AMF 144 may provide transport for SM messages between the UE 102 and the SMF 146, and act as a transparent proxy for routing SM messages. AMF 144 may also provide transport for SMS messages between UE 102 and an SMSF. AMF 144 may interact with the AUSF 142 and the UE 102 to perform various security anchor and context management functions. Furthermore, AMF 144 may be a termination point of a RAN CP interface, which may include or be an N2 reference point between the RAN 104 and the AMF 144; and the AMF 144 may be a termination point of NAS (N1) signaling, and perform NAS ciphering and integrity protection. AMF 144 may also support NAS signaling with the UE 102 over an N3 IWF interface.

The SMF 146 may be responsible for SM (for example, session establishment, tunnel management between UPF 148 and AN 108); UE IP address allocation and management (including optional authorization); selection and control of UP function; configuring traffic steering at UPF 148 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 144 over N2 to AN 108; and determining SSC mode of a session. SM may refer to management of a PDU session, and a PDU session or "session" may refer to a PDU connectivity service that provides or enables the exchange of PDUs between the UE 102 and the data network 136.

The UPF 148 may act as an anchor point for intra-RAT and inter-RAT mobility, an external PDU session point of interconnect to data network 136, and a branching point to support multi-homed PDU session. The UPF 148 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 148 may include an uplink classifier to support routing traffic flows to a data network.

The NSSF 150 may select a set of network slice instances serving the UE 102. The NSSF 150 may also determine allowed NSSAI and the mapping to the subscribed S-NSSAIs, if needed. The NSSF 150 may also determine the AMF set to be used to serve the UE 102, or a list of candidate AMFs based on a suitable configuration and possibly by querying the NRF 154. The selection of a set of network slice instances for the UE 102 may be triggered by the AMF 144 with which the UE 102 is registered by interacting with the NSSF 150, which may lead to a change of AMF. The NSSF 150 may interact with the AMF 144 via an N22 reference point; and may communicate with another NSSF in a visited network via an N31 reference point (not shown). Additionally, the NSSF 150 may exhibit an Nnssf service-based interface.

The NEF 152 may securely expose services and capabilities provided by 3GPP network functions for third party, internal exposure/re-exposure, AFs (e.g., AF 160), edge computing or fog computing systems, etc. In such embodiments, the NEF 152 may authenticate, authorize, or throttle the AFs. NEF 152 may also translate information exchanged with the AF 160 and information exchanged with internal network functions. For example, the NEF 152 may translate between an AF-Service-Identifier and an internal 5GC information. NEF 152 may also receive information from other NFs based on exposed capabilities of other NFs. This information may be stored at the NEF 152 as structured data, or at a data storage NF using standardized interfaces. The stored information can then be re-exposed by the NEF 152 to other NFs and AFs, or used for other purposes such as analytics. Additionally, the NEF 152 may exhibit an Nnef service-based interface.

The NRF 154 may support service discovery functions, receive NF discovery requests from NF instances, and provide the information of the discovered NF instances to the NF instances. NRF 154 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 154 may exhibit the Nnrf service-based interface.

The PCF 156 may provide policy rules to control plane functions to enforce them, and may also support unified policy framework to govern network behavior. The PCF 156 may also implement a front end to access subscription information relevant for policy decisions in a UDR of the UDM 158. In addition to communicating with functions over reference points as shown, the PCF 156 exhibit an Npcf service-based interface.

The UDM 158 may handle subscription-related information to support the network entities' handling of communication sessions, and may store subscription data of UE 102. For example, subscription data may be communicated via an N8 reference point between the UDM 158 and the AMF 144. The UDM 158 may include two parts, an application front end and a UDR. The UDR may store subscription data and policy data for the UDM 158 and the PCF 156, and/or structured data for exposure and application data (including PFDs for application detection, application request information for multiple UEs 102) for the NEF 152. The Nudr service-based interface may be exhibited by the UDR 221 to allow the UDM 158, PCF 156, and NEF 152 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 158 may exhibit the Nudm service-based interface.

The AF 160 may provide application influence on traffic routing, provide access to NEF, and interact with the policy framework for policy control.

In some embodiments, the 5GC 140 may enable edge computing by selecting operator/3rd party services to be geographically close to a point that the UE 102 is attached to the network. This may reduce latency and load on the network. To provide edge-computing implementations, the 5GC 140 may select a UPF 148 close to the UE 102 and execute traffic steering from the UPF 148 to data network 136 via the N6 interface. This may be based on the UE subscription data, UE location, and information provided by the AF 160. In this way, the AF 160 may influence UPF (re)selection and traffic routing. Based on operator deployment, when AF 160 is considered to be a trusted entity, the network operator may permit AF 160 to interact directly with relevant NFs. Additionally, the AF 160 may exhibit an Naf service-based interface.

The data network 136 may represent various network operator services, Internet access, or third party services that may be provided by one or more servers including, for example, application/content server 138.

FIG. 2 schematically illustrates a wireless network 200 in accordance with various embodiments. The wireless network 200 may include a UE 202 in wireless communication with an AN 204. The UE 202 and AN 204 may be similar to, and substantially interchangeable with, like-named components described elsewhere herein.

The UE 202 may be communicatively coupled with the AN 204 via connection 206. The connection 206 is illustrated as an air interface to enable communicative coupling, and can be consistent with cellular communications protocols such as an LTE protocol or a 5G NR protocol operating at mmWave or sub-6 GHz frequencies.

The UE 202 may include a host platform 208 coupled with a modem platform 210. The host platform 208 may include application processing circuitry 212, which may be coupled with protocol processing circuitry 214 of the modem platform 210. The application processing circuitry 212 may run various applications for the UE 202 that source/sink application data. The application processing circuitry 212 may further implement one or more layer operations to transmit/receive application data to/from a data network. These layer operations may include transport (for example UDP) and Internet (for example, IP) operations The protocol processing circuitry 214 may implement one or more of layer operations to facilitate transmission or reception of data over the connection 206. The layer operations implemented by the protocol processing circuitry 214 may include, for example, MAC, RLC, PDCP, RRC and NAS operations.

The modem platform 210 may further include digital baseband circuitry 216 that may implement one or more layer operations that are "below" layer operations performed by the protocol processing circuitry 214 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 210 may further include transmit circuitry 218, receive circuitry 220, RF circuitry 222, and RF front end (RFFE) 224, which may include or connect to one or more antenna panels 226. Briefly, the transmit circuitry 218 may include a digital-to-analog converter, mixer, intermediate frequency (IF) components, etc.; the receive circuitry 220 may include an analog-to-digital converter, mixer, IF components, etc.; the RF circuitry 222 may include a low-noise amplifier, a power amplifier, power tracking components, etc.; RFFE 224 may include filters (for example, surface/bulk acoustic wave filters), switches, antenna tuners, beamforming components (for example, phase-array antenna components), etc. The selection and arrangement of the components of the transmit circuitry 218, receive circuitry 220, RF circuitry 222, RFFE 224, and antenna panels 226 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 214 may include one or more instances of control circuitry (not shown) to provide control functions for the transmit/receive components.

A UE reception may be established by and via the antenna panels 226, RFFE 224, RF circuitry 222, receive circuitry 220, digital baseband circuitry 216, and protocol processing circuitry 214. In some embodiments, the antenna panels 226 may receive a transmission from the AN 204 by receive-beamforming signals received by a plurality of antennas/antenna elements of the one or more antenna panels 226.

A UE transmission may be established by and via the protocol processing circuitry 214, digital baseband circuitry 216, transmit circuitry 218, RF circuitry 222, RFFE 224, and antenna panels 226. In some embodiments, the transmit components of the UE 204 may apply a spatial filter to the data to be transmitted to form a transmit beam emitted by the antenna elements of the antenna panels 226.

Similar to the UE 202, the AN 204 may include a host platform 228 coupled with a modem platform 230. The host platform 228 may include application processing circuitry 232 coupled with protocol processing circuitry 234 of the modem platform 230. The modem platform may further include digital baseband circuitry 236, transmit circuitry 238, receive circuitry 240, RF circuitry 242, RFFE circuitry 244, and antenna panels 246. The components of the AN 204 may be similar to and substantially interchangeable with like-named components of the UE 202. In addition to performing data transmission/reception as described above, the components of the AN 208 may perform various logical functions that include, for example, RNC functions such as radio bearer management, uplink and downlink dynamic radio resource management, and data packet scheduling.

Figure 3:
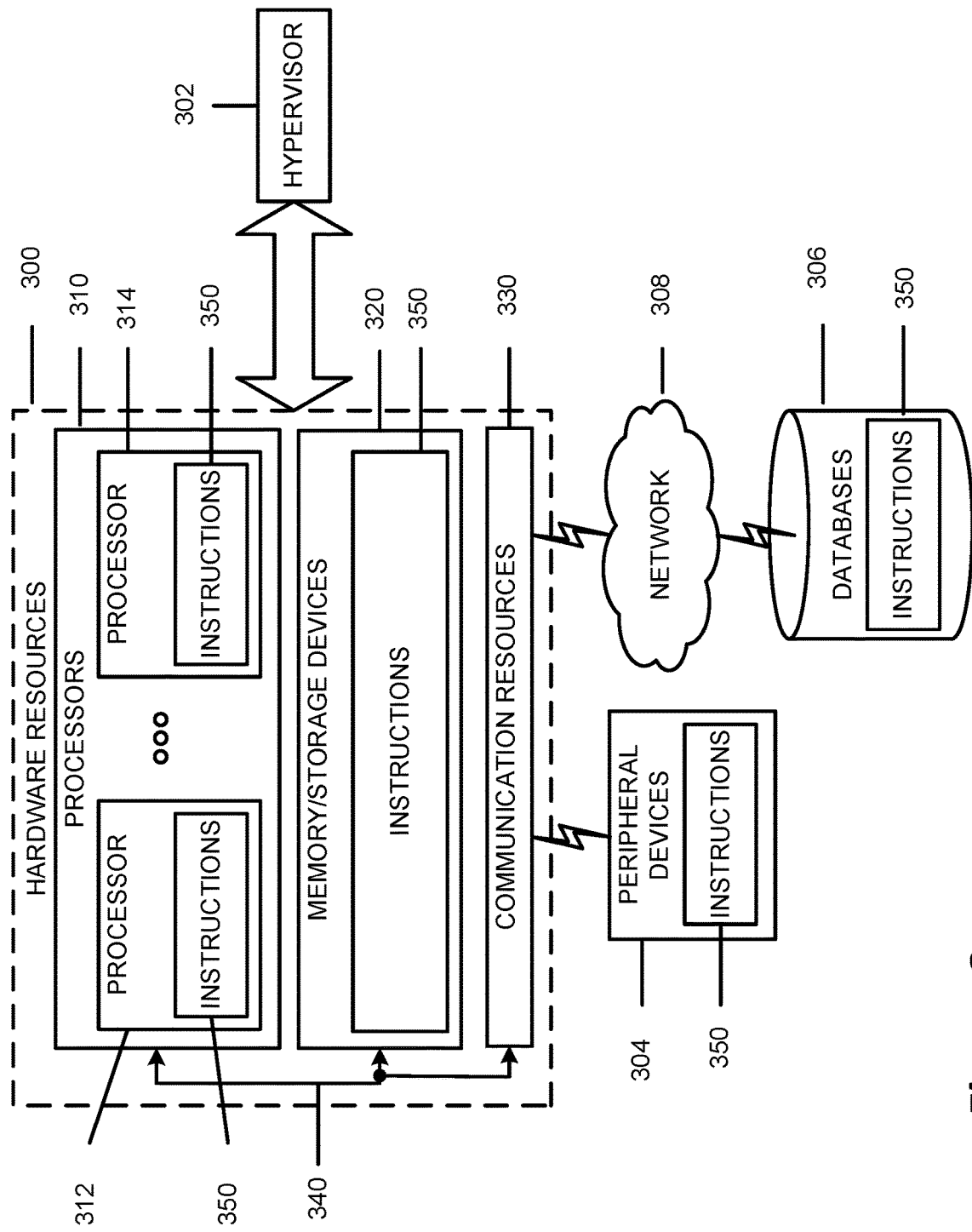
FIG. 3 is a block diagram illustrating components, according to some example embodiments, able to read instructions from a machine-readable or computer-readable medium (e.g., a non-transitory machine-readable storage medium) and perform any one or more of the methodologies discussed herein.

FIG. 3 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 3 shows a diagrammatic representation of hardware resources 300 including one or more processors (or processor cores) 310, one or more memory/storage devices 320, and one or more communication resources 330, each of which may be communicatively coupled via a bus 340 or other interface circuitry. For embodiments where node virtualization (e.g., NFV) is utilized, a hypervisor 302 may be executed to provide an execution environment for one or more network slices/sub-slices to utilize the hardware resources 300.

The processors 310 may include, for example, a processor 312 and a processor 314. The processors 310 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 320 may include main memory, disk storage, or any suitable combination thereof. The memory/storage devices 320 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 330 may include interconnection or network interface controllers, components, or other suitable devices to communicate with one or more peripheral devices 304 or one or more databases 306 or other network elements via a network 308. For example, the communication resources 330 may include wired communication components (e.g., for coupling via USB, Ethernet, etc.), cellular communication components, NFC components, Bluetooth® (or Bluetooth® Low Energy) components, Wi-Fi® components, and other communication components.

Instructions 350 may comprise software, a program, an application, an applet, an app, or other executable code for causing at least any of the processors 310 to perform any one or more of the methodologies discussed herein. The instructions 350 may reside, completely or partially, within at least one of the processors 310 (e.g., within the processor's cache memory), the memory/storage devices 320, or any suitable combination thereof. Furthermore, any portion of the instructions 350 may be transferred to the hardware resources 300 from any combination of the peripheral devices 304 or the databases 306. Accordingly, the memory of processors 310, the memory/storage devices 320, the peripheral devices 304, and the databases 306 are examples of computer-readable and machine-readable media.

Example Procedures

In some embodiments, the electronic device(s), network(s), system(s), chip(s) or component(s), or portions or implementations thereof, of FIGS. 1-3, or some other figure herein, may be configured to perform one or more processes, techniques, or methods as described herein, or portions thereof. One such process is depicted in FIG. 4. In some embodiments, the process of FIG. 4 may be performed by a UE or a portion thereof.

For example, the process may include, at 405, retrieving, from memory, capability information for a reduced capability (RedCap) user equipment (UE) that includes one or more of: an indication of a number of receiver (Rx) branches supported by the RedCap UE for downlink (DL) reception, and an indication of a number of transmitter (Tx) branches supported by the RedCap UE for uplink (UL) transmission. The process further includes, at 410, encoding a message for transmission to a next-generation NodeB (gNB) that includes the capability information.

FIG. 5 illustrates another process in accordance with various embodiments, which may be performed by a gNB or a portion thereof. In this example, the process includes, at 505, receiving, from a reduced capability (RedCap) user equipment (UE), capability information for the RedCap UE that includes one or more of: an indication of a number of receiver (Rx) branches supported by the RedCap UE for downlink (DL) reception, and an indication of a number of transmitter (Tx) branches supported by the RedCap UE for uplink (UL) transmission. The process further includes, at 510, determining configuration information that includes an indication of a maximum number of multiple input multiple output (MIMO) layers for DL reception for the RedCap UE, and a maximum number of MIMO layers for UL transmission for the RedCap UE; and encode a message for transmission to the UE that includes the configuration information. The process further includes, at 515, encoding a message for transmission to the UE that includes the configuration information.

FIG. 6 illustrates another process in accordance with various embodiments. In some embodiments, the process may be performed by a UE or a portion thereof. In this example, the process includes, at 605, determining capability information for the RedCap UE that includes one or more of: an indication of a number of receiver (Rx) branches supported by the RedCap UE for downlink (DL) reception, and an indication of a number of transmitter (Tx) branches supported by the RedCap UE for uplink (UL) transmission. The process further includes, at 610, encoding a message for transmission to a next-generation NodeB (gNB) that includes the capability information.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a system or method of wireless communication for a fifth generation (5G) or new radio (NR) system, that includes support of a reduced capability (RedCap) NR UE, comprising:

reporting by a UE, support of 2 antennas for DL reception and 1 antenna in UL transmission, reporting by the UE, support of one active TCI state for PDCCH reception, receiving by the UE, configuration of maximum MIMO layers of one in DL and UL, or receiving by the UE, a PDCCH scheduling a PDSCH, where DMRS of PDSCH has same TCI state as the DMRS of PDCCH.

Example 2 may include the method of example 1 or some other example herein, where the configuration of maximum MIMO layers is signaled via RRC signaling.

Example 3 may include the method of example 2 or some other example herein, where the configuration is indicated per BWP.

Example 4 may include the method of example 2 or some other example herein, where the configuration is indicated per CC.

Example 5 may include the method of example 1 or some other example herein, where the configuration also includes TRS burst length.

Example 6 may include the method of example 1 or some other example herein, where the configuration also includes processing of 4 CSI reports.

Example X1 includes an apparatus of a reduced capability (RedCap) user equipment (UE) comprising: memory to store capability information for the RedCap UE that includes one or more of: an indication of a number of receiver (Rx) branches supported by the RedCap UE for downlink (DL) reception, and an indication of a number of transmitter (Tx) branches supported by the RedCap UE for uplink (UL) transmission; and processing circuitry, coupled with the memory, to: retrieve the capability information from the memory; and encode a message for transmission to a next-generation NodeB (gNB) that includes the capability information.

Example X2 includes the apparatus of example X1 or some other example herein, wherein the capability information indicates the RedCap UE supports either one or two Rx branches for DL reception.

Example X3 includes the apparatus of example X1 or some other example herein, wherein the processing circuitry is further to receive, from the gNB, configuration information that includes an indication of a maximum number of multiple input multiple output (MIMO) layers for DL reception per DL bandwidth part (BWP), or per serving cell.

Example X4 includes the apparatus of example X3 or some other example herein, wherein the configuration information further includes an indication of a maximum number of MIMO layers for UL transmission per UL bandwidth part (BWP), or per serving cell.

Example X5 includes the apparatus of any of examples X3-X4 or some other example herein, wherein the configuration information is received via radio resource control (RRC) signaling.

Example X6 includes the apparatus of example X1 or some other example herein, wherein the capability information indicates the RedCap UE supports either one or two Rx branches for DL reception, or one Tx branch for UL transmission.

Example X7 includes the apparatus of any of examples X1-X6 or some other example herein, wherein the processing circuitry is further to: support a maximum of one active transmission configuration indicator (TCI) state for physical downlink control channel (PDCCH) reception; and receive a PDCCH transmission scheduling a physical downlink shared channel (PDSCH) transmission, wherein a demodulation reference signal (DMRS) associated with the PDSCH transmission has a common TCI state as a DMRS associated with the PDCCH transmission.

Example X8 includes one or more computer-readable media storing instructions that, when executed by one or more processors, cause a next-generation NodeB (gNB) to: receive, from a reduced capability (RedCap) user equipment (UE), capability information for the RedCap UE that includes one or more of: an indication of a number of receiver (Rx) branches supported by the RedCap UE for downlink (DL) reception, and an indication of a number of transmitter (Tx) branches supported by the RedCap UE for uplink (UL) transmission; determine configuration information that includes an indication of a maximum number of multiple input multiple output (MIMO) layers for DL reception for the RedCap UE, and a maximum number of MIMO layers for UL transmission for the RedCap UE; and encode a message for transmission to the UE that includes the configuration information.

Example X9 includes the one or more computer-readable media of example X8 or some other example herein, wherein the configuration information indicates the maximum number of MIMO layers for DL reception for the RedCap UE per DL bandwidth part (BWP), or per serving cell.

Example X10 includes the one or more computer-readable media of example X8 or some other example herein, wherein the configuration information indicates the maximum number of MIMO layers for UL transmission for the RedCap UE per UL bandwidth part (BWP), or per serving cell.

Example X11 includes the one or more computer-readable media of example X8 or some other example herein, wherein the capability information indicates the RedCap UE supports: either one or two Rx branches for DL reception, or one Tx branch for UL transmission.

Example X12 includes the one or more computer-readable media of any of examples X8-X11 or some other example herein, wherein the media further stores instructions to cause the gNB to: receive, from the RedCap UE, an indication of support by the RedCap UE for a maximum of one active transmission configuration indicator (TCI) state for physical downlink control channel (PDCCH) reception; and encode a PDCCH message for transmission that schedules a physical downlink shared channel (PDSCH) transmission, wherein a demodulation reference signal (DMRS) associated with the PDSCH transmission has a common TCI state as a DMRS associated with the PDCCH transmission.

Example X13 includes one or more computer-readable media storing instructions that, when executed by one or more processors, cause a reduced capability (RedCap) user equipment (UE) to: determine capability information for the RedCap UE that includes one or more of: an indication of a number of receiver (Rx) branches supported by the RedCap UE for downlink (DL) reception, and an indication of a number of transmitter (Tx) branches supported by the RedCap UE for uplink (UL) transmission; and encode a message for transmission to a next-generation NodeB (gNB) that includes the capability information.

Example X14 includes the one or more computer-readable media of example X13 or some other example herein, wherein the capability information indicates the RedCap UE supports: either one or two Rx branches for DL reception, or one Tx branch for UL transmission.

Example X15 includes the one or more computer-readable media of example X13 or some other example herein, wherein the media further stores instructions for causing the RedCap UE to receive, from the gNB, configuration information that includes an indication of a maximum number of multiple input multiple output (MIMO) layers for DL reception per DL bandwidth part (BWP), or per serving cell.

Example X16 includes the one or more computer-readable media of example X15 or some other example herein, wherein the configuration information further includes an indication of a maximum number of MIMO layers for UL transmission per UL bandwidth part (BWP), or per serving cell.

Example X17 includes the one or more computer-readable media of any of examples X15-X16 or some other example herein, wherein the configuration information is received via radio resource control (RRC) signaling.

Example X18 includes the one or more computer-readable media of any of examples X13-X17, wherein the media further stores instructions to cause the RedCap UE to: encode a second message for transmission to the gNB that includes an indication of support by the RedCap UE for a maximum of one active transmission configuration indicator (TCI) state for physical downlink control channel (PDCCH) reception; and receive a PDCCH transmission scheduling a physical downlink shared channel (PDSCH) transmission, wherein a demodulation reference signal (DMRS) associated with the PDSCH transmission has a common TCI state as a DMRS associated with the PDCCH transmission.

Example Z01 may include an apparatus comprising means to perform one or more elements of a method described in or related to any of examples 1-X18, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-X18, or any other method or process described herein.

Example Z03 may include an apparatus comprising logic, modules, or circuitry to perform one or more elements of a method described in or related to any of examples 1-X18, or any other method or process described herein.

Example Z04 may include a method, technique, or process as described in or related to any of examples 1-X18, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-X18, or portions thereof.

Example Z06 may include a signal as described in or related to any of examples 1-X18, or portions or parts thereof.

Example Z07 may include a datagram, packet, frame, segment, protocol data unit (PDU), or message as described in or related to any of examples 1-X18, or portions or parts thereof, or otherwise described in the present disclosure.

Example Z08 may include a signal encoded with data as described in or related to any of examples 1-X18, or portions or parts thereof, or otherwise described in the present disclosure.

Example Z09 may include a signal encoded with a datagram, packet, frame, segment, protocol data unit (PDU), or message as described in or related to any of examples 1-X18, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-X18, or portions thereof.

Example Z11 may include a computer program comprising instructions, wherein execution of the program by a processing element is to cause the processing element to carry out the method, techniques, or process as described in or related to any of examples 1-X18, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An apparatus of a reduced capability (RedCap) user equipment (UE) comprising:
   memory to store capability information for the RedCap UE that includes one or more of:
   an indication of a number of receiver (Rx) branches supported by the RedCap UE for downlink (DL) reception, and an indication of a number of transmitter (Tx) branches supported by the RedCap UE for uplink (UL) transmission; and
   processing circuitry, coupled with the memory, to:
   retrieve the capability information from the memory;
   encode a message for transmission to a next-generation NodeB (gNB) that includes the capability information;
   support a maximum of one active transmission configuration indicator (TCI) state for physical downlink control channel (PDCCH) reception; and
   receive a PDCCH transmission scheduling a physical downlink shared channel (PDSCH) transmission, wherein a demodulation reference signal (DMRS) associated with the PDSCH transmission has a common TCI state as a DMRS associated with the PDCCH transmission.

2. The apparatus of claim 1, wherein the capability information indicates the RedCap UE supports either one or two Rx branches for DL reception.

3. The apparatus of claim 1, wherein the processing circuitry is further to receive, from the gNB, configuration information that includes an indication of a maximum number of multiple input multiple output (MIMO) layers for DL reception per DL bandwidth part (BWP), or per serving cell.

4. The apparatus of claim 3, wherein the configuration information further includes an indication of a maximum number of MIMO layers for UL transmission per UL bandwidth part (BWP), or per serving cell.

5. The apparatus of claim 3, wherein the configuration information is received via radio resource control (RRC) signaling.

6. The apparatus of claim 1, wherein the capability information indicates the RedCap UE supports either one or two Rx branches for DL reception, or one Tx branch for UL transmission.

7. One or more non-transitory computer-readable media storing instructions that, when executed by one or more processors, cause a next-generation NodeB (gNB) to:
   receive, from a reduced capability (RedCap) user equipment (UE), capability information for the RedCap UE that includes one or more of: an indication of a number of receiver (Rx) branches supported by the RedCap UE for downlink (DL) reception, and an indication of a number of transmitter (Tx) branches supported by the RedCap UE for uplink (UL) transmission;
   determine configuration information that includes an indication of a maximum number of multiple input multiple output (MIMO) layers for DL reception for the RedCap UE, and a maximum number of MIMO layers for UL transmission for the RedCap UE;
   encode a message for transmission to the UE that includes the configuration information;
   receive, from the RedCap UE, an indication of support by the RedCap UE for a maximum of one active transmission configuration indicator (TCI) state for physical downlink control channel (PDCCH) reception; and
   encode a PDCCH message for transmission that schedules a physical downlink shared channel (PDSCH) transmission, wherein a demodulation reference signal (DMRS) associated with the PDSCH transmission has a common TCI state as a DMRS associated with the PDCCH transmission.

8. The one or more non-transitory computer-readable media of claim 7, wherein the configuration information indicates the maximum number of MIMO layers for DL reception for the RedCap UE per DL bandwidth part (BWP), or per serving cell.

9. The one or more non-transitory computer-readable media of claim 7, wherein the configuration information indicates the maximum number of MIMO layers for UL transmission for the RedCap UE per UL bandwidth part (BWP), or per serving cell.

10. The one or more non-transitory computer-readable media of claim 7, wherein the capability information indicates the RedCap UE supports either one or two Rx branches for DL reception, or one Tx branch for UL transmission.

11. One or more non-transitory computer-readable media storing instructions that, when executed by one or more processors, cause a reduced capability (RedCap) user equipment (UE) to:
   determine capability information for the RedCap UE that includes one or more of: an indication of a number of receiver (Rx) branches supported by the RedCap UE for downlink (DL) reception, and an indication of a number of transmitter (Tx) branches supported by the RedCap UE for uplink (UL) transmission;

encode a message for transmission to a next-generation NodeB (gNB) that includes the capability information;

encode a second message for transmission to the gNB that includes an indication of support by the RedCap UE for a maximum of one active transmission configuration indicator (TCI) state for physical downlink control channel (PDCCH) reception; and receive a PDCCH transmission scheduling a physical downlink shared channel (PDSCH) transmission, wherein a demodulation reference signal (DMRS) associated with the PDSCH transmission has a common TCI state as a DMRS associated with the PDCCH transmission.

12. The one or more non-transitory computer-readable media of claim 11, wherein the capability information indicates the RedCap UE supports either one or two Rx branches for DL reception, or one Tx branch for UL transmission.

13. The one or more non-transitory computer-readable media of claim 11, wherein the media further stores instructions for causing the RedCap UE to receive, from the gNB, configuration information that includes an indication of a maximum number of multiple input multiple output (MIMO) layers for DL reception per DL bandwidth part (BWP), or per serving cell.

14. The one or more non-transitory computer-readable media of claim 13, wherein the configuration information further includes an indication of a maximum number of MIMO layers for UL transmission per UL bandwidth part (BWP), or per serving cell.

15. The one or more non-transitory computer-readable media of claim 13, wherein the configuration information is received via radio resource control (RRC) signaling.

\* \* \* \* \*